United States Patent
Osako et al.

(10) Patent No.: US 6,220,983 B1
(45) Date of Patent: Apr. 24, 2001

(54) TOOTHED POWER TRANSMISSION BELT

(75) Inventors: Nobutaka Osako, Hyogo; Akihiro Ueno, Akashi; Yasunori Nakai, Hyogo, all of (JP)

(73) Assignee: Mitsuboshi Belting Ltd., Hyogo (JP)

( * ) Notice: Subject to any disclaimer, the term of this patent is extended or adjusted under 35 U.S.C. 154(b) by 0 days.

(21) Appl. No.: 09/293,348

(22) Filed: Apr. 16, 1999

(30) Foreign Application Priority Data

Apr. 20, 1998 (JP) ................................................. 10-109874
Mar. 24, 1999 (JP) ................................................. 11-078976

(51) Int. Cl.$^7$ ..................................................... F16G 1/04
(52) U.S. Cl. ........................ 474/260; 474/205; 474/263
(58) Field of Search .................................. 474/260, 261, 474/263, 264, 265, 153, 139, 267, 250, 268, 237; 428/290, 292; 198/847, 246–250, 846

(56) References Cited

U.S. PATENT DOCUMENTS

| | | | |
|---|---|---|---|
| 3,643,518 | * 2/1972 | Semin et al. | 474/153 X |
| 4,705,161 | * 11/1987 | Grozdiff | 198/847 |
| 4,721,496 | * 1/1988 | Yokoyama et al. | 474/205 |
| 4,790,802 | * 12/1988 | Onoe et al. | 474/260 |
| 4,888,091 | * 12/1989 | Nollen et al. | 162/109 |
| 5,378,206 | 1/1995 | Mizuno et al. | |
| 5,417,618 | 5/1995 | Osako et al. | |
| 5,584,771 | * 12/1996 | Isshiki et al. | 474/264 |
| 5,611,745 | * 3/1997 | Uto et al. | 474/205 |
| 5,705,446 | 1/1998 | Fujishiro et al. | |

FOREIGN PATENT DOCUMENTS

| | | |
|---|---|---|
| 0 229 949 | 12/1986 | (EP) . |
| 0 461 865 | 6/1991 | (EP) . |
| 0 713 983 | 11/1995 | (EP) . |
| 0 840 036 | 10/1997 | (EP) . |
| 0961050 | 4/1999 | (EP) . |
| 62-159827 | 12/1985 | (JP) . |
| 61-075836 | 4/1986 | (JP) . |
| 5-44607U | 1/1988 | (JP) . |
| 76935 | * 4/1988 | (JP) . |
| 63-270945 | 11/1988 | (JP) . |
| 01269743 | 10/1989 | (JP) . |
| 04008948 | 1/1992 | (JP) . |
| 58320 | * 1/1993 | (JP) . |
| 208556 | * 8/1995 | (JP) . |
| 287496 | * 10/1995 | (JP) . |

OTHER PUBLICATIONS

Undated Abstract, Document 99250126.2, Origin unknown.

* cited by examiner

*Primary Examiner*—David A. Bucci
*Assistant Examiner*—Marcus Charles
(74) *Attorney, Agent, or Firm*—Wood, Phillips, VanSanten, Clark & Mortimer

(57) ABSTRACT

A toothed belt having a body with a length, an inside surface, an outside surface, laterally spaced sides, and a plurality of teeth spaced in a lengthwise direction on the inside of the body. An elongate, load carrying cord extends lengthwise of the body and is embedded in the body. A cloth layer is provided on the inside surface of the body. The load carrying cord has a diameter that is greater than 1.1 mm and not greater than 1.5 mm and is prepared by a) bundling glass fiber filaments each having a diameter of from 5 to 10 $\mu$m into strands, b) gathering and primary twisting a plurality of stands in one twist direction to form strings, and c) gathering and final twisting the strings in a direction oppositely to the one twist direction.

20 Claims, 1 Drawing Sheet

TOOTHED POWER TRANSMISSION BELT

BACKGROUND OF THE INVENTION

1. Field of the Invention

This invention relates to power transmission belts and, more particularly, to a belt which has drive/driven teeth along the length thereof.

2. Background Art

Unlike flat belts, V-belts, and the like, toothed belts are not prone to slipping and therefore are highly efficient in transmitting driving forces. Toothed power transmission belts have an advantage over gears, chains, and the like, because they generally do not generate the same level of noise in operation. Because of these advantages, toothed belts are becoming widely used. As one example, toothed belts are used for synchronous driving of overhead cam (OHC) shafts in automobiles. The field of use for these toothed belts continues to expand.

Toothed belts for driving OHC shafts may be operated in automobile engine compartments at high temperatures, at high speeds, and under heavy loads. Automobiles are being redesigned with higher performance internal combustion engines which are operated in even smaller engine compartments. As a result, toothed belts are required to operate in environments at even higher temperatures and still further to wrap around pulleys with relatively small diameters, which often requires the belts to bend at severe angles.

In known toothed belts, load carrying cords are embedded in a back layer at predetermined intervals along the belt width. When such belts are operated around small diameter pulleys, the load carrying cords must bend sharply and are thus required to be highly flexible. In the absence of the necessary flexibility and resiliency, the load carrying cords may break after a relatively short running period.

In one conventional construction, load carrying cords for toothed belts are prepared by bundling and twisting E-glass/ordinary non-alkali glass fiber filaments. One such load carrying cord construction is shown in JP-A 62-159827.

In one known construction, load carrying cords are prepared by dipping E-glass fiber filaments with a diameter of 9 $\mu$m in a resorcinol-formalin resin latex mixture (hereinafter RFL). The filaments are bundled into strands which are twisted in a 3/13 process. That is, 3 strands of RFL-processed glass fiber filaments are primary twisted into a string, followed by final twisting of 13 of the strings into a load carrying cord.

This latter type of belt may have a shortened life in certain high performance internal combustion engines. The life of these high performance internal combustion engines is being increased while the life of the toothed belts used in those engines may not be proportionately lengthened. As a result, the toothed belts used for OHC shaft driving may have to be changed relatively frequently during the life of an automobile.

Another problem with toothed belts in this environment, i.e. at high speeds around small diameter pulleys, is that the fibers making up the load carrying cords may generate a significant amount of frictional heat in the belts. This may degrade the adhesion between a canvas covering cloth and the rubber. This heat may also affect the adhesion between the load carrying cords and the rubber. Further, the heat may have a negative influence on both the canvas covering cloth and the rubber making up the belt body. All of these problems contribute to a potentially shortened life for a toothed belt in this environment.

In JP-B 5-44607U, a toothed belt is described with load carrying cords prepared by processing high-strength E-glass fiber filaments, having a diameter from 6 to 8 $\mu$m, with RFL. A predetermined number of the processed filaments are bundled into strands and twisted with a primary twist count of from 7.2 to 8.8 twists/10 cm to produce strings of from 500 to 800 filaments per string. The strings are in turn final twisted at a count of from 7.2 to 8.8 twists/10 cm in a direction opposite to the primary twist direction to produce load carrying cords with 9–12 strings per cord.

Even with this type of load carrying cord, in the environment of the modern internal-combustion engines, the load carrying cords may elongate with the belt run under a heavy load. As a result, the belt itself may be elongated. If this occurs, the belt teeth may not properly engage with cooperating pulleys, eventually potentially leading to abrasion, cracking and potential breakage in a relatively early stage of the anticipated belt life.

Further, if the width of the belt is reduced to minimize the overall size of the belt and associated components, even under an ordinary load, the load per unit width of the belt may be relatively large. The teeth in this situation are likewise prone to cracking and breaking prematurely.

It is known to cover the teeth with a nylon cloth. However, since the initial tension of the belt under heavy load may be high, the abrasion resistance of the nylon cloth may not be satisfactory. The land region between adjacent teeth may become abraded at an early stage in the belt life. The teeth may crack or break to prematurely end the belt life.

SUMMARY OF THE INVENTION

The invention is directed to a toothed belt having a body with a length, an inside surface, an outside surface, laterally spaced sides, and a plurality of teeth spaced in a lengthwise direction on the inside of the body. An elongate, load carrying cord extends lengthwise of the body and is embedded in the body. A cloth layer is provided on the inside surface of the body. The load carrying cord has a diameter of 1.1 to 1.5 mm and is prepared by a) bundling glass fiber filaments each having a diameter of from 5 to 10 $\mu$m into strands, b) gathering and primary twisting a plurality of stands in one twist direction to form strings, and c) gathering and final twisting the strings in a direction oppositely to the one twist direction.

The glass fiber filaments may be high-strength glass fiber filaments.

The inside surface of the belt body includes lands between adjacent teeth. In one form, the cloth layer covers the lands and the teeth on the inside surface of the body.

The load carrying cord has a center. In one form, the cloth layer has an inside surface and an outside surface and the distance between the center of the load carrying cord and the inside surface of the cloth layer at the lands is from 0.75 to 1.00 mm.

The glass fibers may be at least one of U-glass, T-glass, R-glass, and S-glass.

The strands may be primary twisted from 6–16 twists/10 cm.

In one form, each string has from 400–800 fiber filaments.

The strings may be final twisted from 5–10 twists/10 cm.

The number of final twists per unit length for the strings may be 0–10% less than the number of primary twists per unit length for the strands.

The load carrying cord may have from 15–25 strings.

In one form, the cloth layer has warp and weft yarns which are made at least partially from aramid fiber.

The cloth layer may be woven fabric with an aramid fiber content of at least 50%.

The aramid fibers may be at least one of poly-paraphenylene-terephthalamide, poly-metaphenylene-isophthalamiade, and poly-paraphenylene-3,4-diphenyl ether-terephthalamide.

The body has a back layer within which the load carrying cords are embedded. In one form, the back layer and the teeth are made from an elastomer that is acrylonitrile-butadiene copolymer rubber that is hydrogenated to at least 80% by weight.

The elastomer may further include at least one of carbon black, a plasticizer, and a cross-linking agent.

The back layer and the teeth may be a cross-linked rubber composition.

It is an object of the present invention to provide a durable belt with good tensile strength and a high modulus of tensile elasticity. It is a further object to provide a belt that is not prone to excessive belt elongation, even with the belt run under high load and even under overload conditions. It is a further object to provide a toothed belt that can run for extended periods while maintaining accurate engagement with a cooperating pulley throughout the belt life. It is a further object to provide a belt having the ability to transmit high loads with good flexure fatigue resistance. It is a further object to provide a belt having good resistance to abrasion, heat, and oil. One or more of these objectives may be realized by making a belt according to the claims herein.

DETAILED DESCRIPTION OF THE DRAWINGS

Figure 1:
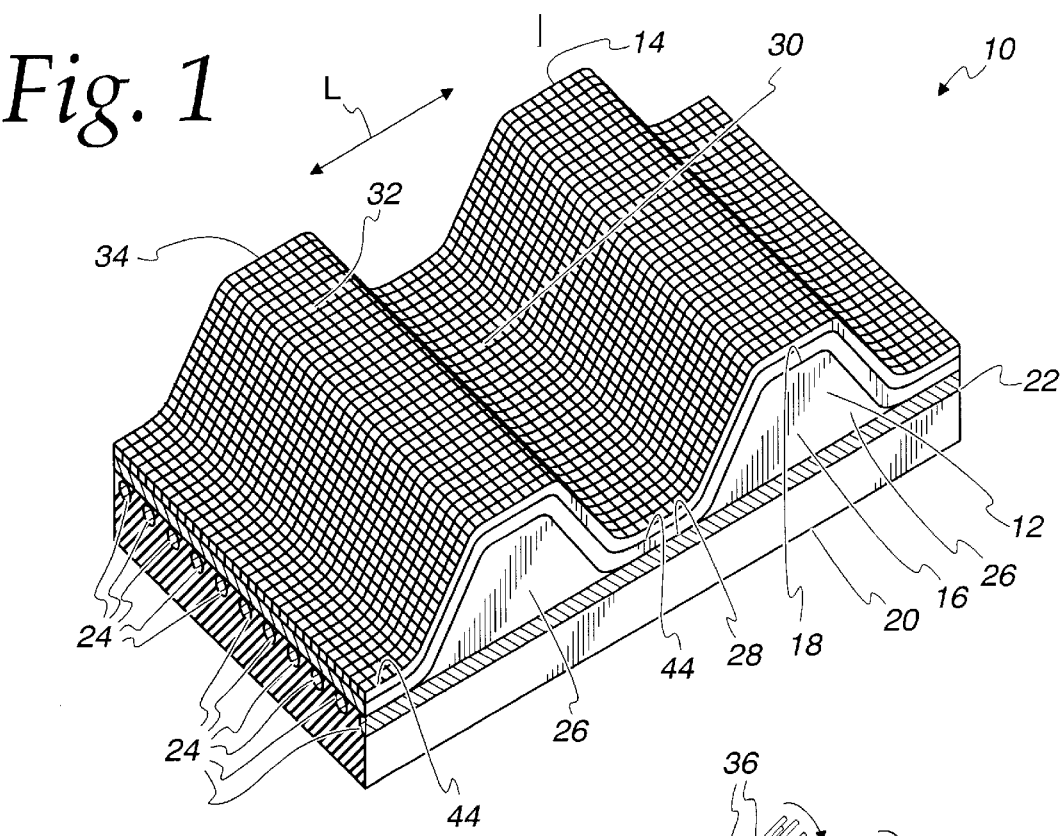
FIG. 1 is a fragmentary, perspective view of a toothed belt, made according to the present invention.

In FIG. 1, one form of toothed belt, according to the present invention, is shown at 10. The belt 10 consists of a body 12 having a length in the direction of the double-headed arrow L, a width between laterally oppositely facing side surfaces 14, 16, an inside surface 18, and an outside surface 20. The body has a back layer 22 within which laterally spaced, and longitudinally extending, load carrying cords 24 are embedded. The body 12 has a plurality of teeth 26 spaced at regular intervals along the length of the belt, with there being lands 28 between adjacent teeth 26. A cloth covering layer 30 is adhered to the inside surfaced 18 and covers the teeth 26 and the lands 28. The cloth layer 30 is defined by woven warp and weft yarns 32, 34.

Preferably, the load carrying cords 24 are not made from E-glass fiber filaments (ordinary non-alkali glass fiber filaments), as used in the prior art. Instead, the load carrying cords 24 are made by twisting high-strength glass fiber filaments in a predetermined manner. The high-strength glass fibers differ from conventional E-glass fibers in that the proportions of $SiO_2$, $Al_2O_3$ and $MgO$ are increased while the proportions of $CaO$ and $B_2O_3$ are decreased in the high-strength glass fibers. The components in these two types of glass fibers are shown in Table 1 below.

TABLE 1

| Components | High-Strength Glass | E-Glass |
|---|---|---|
| $SiO_2$ (%) | 60 to 65 | 52–56 |
| $Al_2O_3$ (%) | 23 to 26 | 12 to 16 |
| $CaO$ (%) | 0 to 10 | 12 to 25 |
| $MgO$ (%) | 7 to 11 | 0 to 6 |
| $B_2O_3$ (%) | 0 to 1 | 8 to 13 |
| $R_2O$ (%) | 0 to 0.5 | 0 to 0.8 |

As a result, as shown in Table 2, the tensile strength and modulus of elasticity of the high-strength glass fibers are higher than those of E-glass fibers.

TABLE 2

| | High-Strength Glass Fibers | E-Glass Fibers |
|---|---|---|
| Tensile Strength (kgf/mm$^2$) | 450 to 480 | 350 |
| Modulus of Elasticity (kgf/mm$^2$) | 8600 to 8700 | 7400 |

The glass fibers, in which the components are modified as in Table 1, are referred to as high-strength glass fibers. U-glass fibers (from Nippon Glass Fiber), T-glass fibers (from Nitto Spinning), R-glass fibers (from Vetrotex Saint Gobain), and S-glass fibers (from Owens Corning Fiberglass), etc. are examples of high-strength glass fibers.

Figure 2:
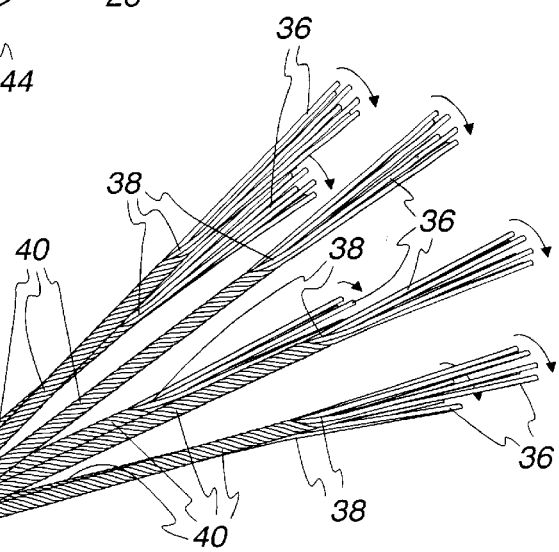
FIG. 2 is an enlarged, fragmentary, perspective view of a load carrying cord in the toothed belt of FIG. 1.

The load carrying cords 24, as seen also in FIG. 2, preferably have a diameter of from 1.1 to 1.5 mm and are prepared by bundling filaments 36 of high-strength glass fibers into strands 38. The filaments 36 have a diameter of from 5 to 10 μm and are preferably 7 μm in diameter. The strands 38 are gathered and primary twisted from 6 to 16 twists/10 cm into strings 40 of from 400–800 filaments per string 40. The resulting strings 40 are final twisted from 5 to 10 twists/10 cm in a direction opposite to the primary twist direction to produce load carrying cords 24 of from 15–25 strings 40 per tensile member. It is preferred that the number of final twists per unit length is 0–10% smaller than that number of primary twists per unit length.

If the diameter of the high-strength glass fiber filaments 36 is smaller than 5 μm, the spinning and bundling steps may be difficult to perform, potentially increasing the number of steps to prepare the load carrying cords 24. If the filament diameter is greater than 10 μm, the flexing fatigue resistance of the belt 10 incorporating the load carrying cords 24 may be significantly lowered during belt running.

If the primary twist number is smaller than 6 twists/10 cm, water might readily penetrate into the glass fiber to detrimentally lower the water resistance of the load carrying cords 24. On the other hand, if the primary twist number is greater than 16 twists/10 cm, the strength of the load carrying cords 24 may be detrimentally lowered.

If the final twist number is less than 5 twists/10 cm, the flexing fatigue resistance of the belt may be diminished. However, if the final twist number is greater than 10 twists/10 cm, the load carrying cords 24 may elongate to an undesirable degree with the belt 10 running under a high load. This may result in the belt 10 not properly engaging a cooperating pulley, which could result in tooth cracking and/or breakage.

If the diameter of the load carrying cords 24 is less than 1.1 mm, the initial tensile strength of the load carrying cords 24 may be undesirably low. The elongation of the belt 10 in relationship to the operating stress may become high, as a result of which the belt 10 may not properly engage with a cooperating pulley, again potentially resulting in tooth cracking and/or breakage.

On the other hand, if the load carrying cord diameter is greater than 1.5 mm, the PLD value, as described below for the belt 10, may be too large compared to PLD values for a cooperating pulley. The result may be that the belt 10 engages the cooperating pulleys in a polygonal manner around them, resulting in lowering of flexing fatigue resistance for the belt, thereby potentially shortening the belt life.

With a toothed belt operating with an automobile engine under a predetermined tension, the tooth pitch generally has a length between 8.0 mm and 9.525 mm on a virtual pitch line. The virtual pitch line, with the belt teeth engaging with the grooves of a cooperating pulley, is a virtual distance between the bottom land of the belt and the pitch line (PLD value), and is 0.686 mm.

PLD can be measured as follows. The belt 10 can be cut with a sharp cutter across the width of the belt 10, bisecting one of the lands 26. The cross section can then be enlarged with a projector, or the like. In the enlarged view of this cross section, the distance (a) between the inside surface 44 at the land 28 and the inner edge of the load carrying cord 24 and the distance (b) between the inside surface 44 at the land 28 and the outer edge of the load carrying cord 24 are measured. PLD is calculated according to the following formula:

$$PLD=(a+b)/2$$

The above data is obtained for all load carrying cords 24 along the width of the belt 10, with the exception of any load carrying cord 24 that may be cut at the side surfaces 14, 16. The values obtained for the cords 24 are averaged. The average value is the intended PLD value at the site of the belt at which the data is obtained. Because the PLD value of a given belt may vary at different locations along the belt length, it is desirable that at least three measurements be made at equally spaced sites and that the measured data be averaged.

PLD value is the distance between the inside surface 44 at the lands 28 and the center of the load carrying cords 24. Generally, the PLD value of a belt under tension is 0.686 mm. The corresponding PLD value with the belt under no tension is between 0.68 and 0.72 mm.

However, with the inventive belt 10, with high strength glass fibers utilized to produce load carrying cords 24 having a diameter of 1.1 to 1.5 mm, the PLD value is preferably between 0.75 and 1.00 mm. The thickness of the cloth layer 30 does not have to be reduced even if the diameter of the load carrying cords 24 is relatively large. As a result, the cloth layer 30 resists wear in use, which potentially adds to the life of the belt 10.

If the PLD value is smaller than 0.75 mm, the cloth layer 30 is thinner and prone to being worn away. This may shorten belt life. On the other hand, if the PLD value is greater than 1.00 mm, the belt teeth 26 may not properly engage with cooperating pulleys as the belt 10 is run, again potentially leading to premature tooth cracking or breakage.

The back layer 22 and teeth 26 are made from a rubber-like elastic substance which may be prepared by cross-linking a rubber composition. The rubber composition may be prepared by adding carbon black, a plasticizer, a cross-linking agent, and other optional additive(s) to 100 parts by weight of hydrogenated nitrile rubber having a degree of hydrogenation of at least 80% by weight.

If the degree of hydrogenation of the hydrogenated nitrile rubber is less than 80% by weight, the rubber in the back layer 22 and the teeth 26 may degrade under heat and crack at an early stage in the belt life. The belt 10 could be cut or the teeth 26 cracked and/or broken before the anticipated life of the belt 10 is reached.

The plasticizer may be, for example, a trimellitic acid-based, a polyether-type, polyester-type and a phthalic acid-based plasticizer, but is not so limited.

A suitable cross-linking agent for sulfur vulcanization preferably has 0.5 to 2 parts by weight of sulfur per 100 parts by weight of hydrogenated nitrile rubber and is combined with a vulcanization promoter, such as mercaptobenzothiazole, dibenzothiazyl disulfide, N-cyclohexyl-2-benzothiazylsulfenamide, tetramethylthiuram disulfide, tetraethylthiuram disulfide, or the like. The cross-linking agent for organic peroxide vulcanization preferably has 0.2 to 10 parts by weight of an organic peroxide per 100 parts by weight of hydrogenated nitrile rubber. The organic peroxide may be, for example, 1,1-di-t-butylperoxy-3,3,5-trimethylcyclohexane, di-t-butyl peroxide, dibutyl-cumyl peroxide, dicumyl peroxide, 2,5-dimethyl-2,5-di-(t-butylperoxy) hexane, 2,5-dimethyl-2,5-di(t-butylperoxy) hexane, 2,5-dimethyl-2,5-di(t-butylperoxy) hexane, 1,3-bis (t-butylperoxyisopropyl)benzene, t-butylperoxyisopropyl carbonate, etc. Sulfur compounds, oxime-nitroso compounds, monomers, and polymers, that are generally used as co-cross-linking agents, may be added thereto.

It is desirable that the hardness of the elastomer in the back layer 22 and teeth 26 be between 60 and 75 and more preferably between 65 and 70, as measured with a spring-type hardness meter described in JIS K6301. This is preferred to control noise caused by vibration of the belt running and to prevent shortening of the belt life. If the hardness is less than 60, the teeth 26 may be deformed to an undesired extent with the belt 10 engaged with a cooperating pulley. This could lead to shortened belt life. On the other hand, if the hardness is greater than 75, the belt 10 may have a tendency to vibrate as it is running, which could potentially produce significant, unwanted noise.

Typically, the covering cloth layer on this type of belt is an adhesive-processed woven fabric of aliphatic polyamide fibers (nylon fiber) that may be one of nylon 6, nylon 6,6, or the like. However, the cloth layer 30 herein is preferably a woven fabric of aromatic polyamide fiber (aramid fiber) having a higher strength and a higher decomposition temperature than nylon fiber, as well as good abrasion resistance. Using this type of fabric affords good abrasion resistance and crack resistance for the teeth 26.

It is not necessary that the woven fabric defining the cloth layer 30 be made from 100% aramid fibers. It is desirable that exposed warp and weft yarns 32, 34 in the woven fabric be aramid fiber. It is preferred that at least 50% of the fibers defining the woven fabric in the cloth layer 30 be aramid fibers. Suitable aramid fibers are poly-paraphenylene-terephthalamide, poly-metaphenylene-isophthalamide, poly-paraphenylene-3,4-diphenyl either-terephthalamide, etc.

The invention can be more clearly understood with reference to the following examples. The components shown in Table 3, below, were mixed and kneaded for 4 minutes in a Banbury mixer to prepare a rubber composition for the rubber-like elastic substance for the back layers and teeth.

TABLE 3

| Components | Rubber Composition (wt. pts.) |
| --- | --- |
| Hydrogenated NBR *1 | 100 |
| Carbon Black (HAF) | 35 |
| Antioxidant | 2 |
| Stearic Acid | 2 |
| Plasticizer *2 | 5 |
| Zinc Flower | 5 |
| Stearic Acid | 2 |
| Vulcanization Promoter | 2 |
| Sulfur | 0.5 |

*1: Zetpole 2010L from Nippon Zeon (degree of hydrogenation: 95% by weight)
*2: Dioctyl sebacate The rubber composition was rolled with an open roll and press-vulcanized at 165° C. for 30 minutes into a vulcanized rubber sheet. The hardness of the sheet was measured. The sheet was subjected to a tensile test according to JIS K6301. The data obtained is shown in Table 4, below.

TABLE 5

| Type of Tooth-Covering Cloth | B-1 | B-2 | B-3 |
| --- | --- | --- | --- |
| Weft | | | |
| Material | 6,6 nylon + polyurethane elastic yarn | Cornex ™ + polyurethane elastic yarn | Technora ™ + polyurethane elastic yarn |
| Yarn Constitution | 280 d/yarn +140 d/yarn | 20 S/2 yarns + 140 d/yarn | 200 d/2 yarns + 210 d/2 yarns |
| Weave Density | 140 yarns/50 mm | 100 yarns/50 mm | 80 yarns/50 mm |
| Warp | | | |
| Material | 6,6 nylon | 6,6 nylon | Technora ™ |
| Yarn Constitution | 210 d/yarn | 210 d/yarn | 200 d/yarn |
| Weave density | 100 yarns/50 mm | 80 yarns/50 mm | 80 yarns/50 mm |

The fabrics were dipped in an RFL liquid, dried, and heat treated. Next they were dipped in a rubber paste, prepared by dissolving the rubber composition of Table 3 in a solvent, and dried for surface treatment. The thus-processed fabrics were formed into endless cylindrical sleeves, with each placed around the outer surface of a cylindrical mold having tooth forming grooves on the outer surface thereof. A pair of S-twisted and Z-twisted glass load carrying cords, having the composition and constitution shown in Table 6, below, were wound alternately around the sleeve on the mold.

TABLE 6

| Type of Load Carrying Cord | A-1 | A-2 | A-3 | A-4 | A-5 | A-6 | A-7 |
| --- | --- | --- | --- | --- | --- | --- | --- |
| Glass composition | E-glass | E-glass | E-glass | High-strength glass | High-strength glass | High-strength glass | High-strength glass |
| Filament Diameter ($\mu$m) | 9 | 9 | 9 | 7 | 7 | 7 | 9 |
| Number of Filaments/String | 600 | 600 | 600 | 600 | 600 | 600 | 600 |
| Count of Primary Twisting (twists/10 cm) | 12 | 12 | 12 | 12 | 12 | 12 | 12 |
| Number of Strings/Load Carrying Cord | 11 | 15 | 20 | 11 | 19 | 24 | 24 |
| Count of Final Twisting (twists/10 cm) | 8 | 8 | 8 | 8 | 8 | 8 | 8 |
| Load Carrying Cord Diameter (mm) | 1.1 | 1.3 | 1.5 | 0.9 | 1.2 | 1.3 | 1.6 |

TABLE 4

| Physical Properties | | Rubber Composition (wt. pts.) |
| --- | --- | --- |
| Hardness | (JIS-A) | 64 |
| 100% Modulus (M100) | (MPa) | 2.8 |
| Tensile Strength | (MPa) | 30.0 |
| Elongation (%) | | 550 |

INVENTIVE EXAMPLES 1–3 AND COMPARATIVE EXAMPLE 1–4

Fabrics having the constitution shown in Table 5, below, were woven for the cloth layers The rubber composition of Table 3, for a rubber-like elastic substance, was rolled into a sheet having a thickness of 2.5 mm. The sheet was wound over the tensile members and vulcanized. The thus-vulcanized sleeve was cut into endless belts each having a predetermined width. The toothed belts resulting were of a 105ZB19 construction (tooth form: ZB type; number of teeth: 105; width: 19 mm; tooth pitch: 8.0 mm).

The combinations of the load carrying cords and tooth covering cloth layers for the belts is shown in Table 7, below.

TABLE 7

|  | Inventive Example 1 | Inventive Example 2 | Inventive Example 3 | Comparative Example 1 | Comparative Example 2 | Comparative Example 3 | Comparative Example 4 |
| --- | --- | --- | --- | --- | --- | --- | --- |
| Belt No. | C-1 | C-2 | C-3 | C-4 | C-5 | C-6 | C-7 |
| Type of Load Carrying Cord | A-5 | A-5 | A-6 | A-7 | A-1 | A-2 | A-4 |
| Pitch of Load Carrying Cord (mm) | 1.4 | 1.4 | 1.5 | 1.8 | 1.3 | 1.5 | 1.1 |
| Type of tooth-covering cloth | B-2 | B-3 | B-2 | B-3 | B-2 | B-1 | B-3 |
| PLD (mm) | 0.90 | 0.85 | 0.95 | 1.05 | 0.85 | 0.85 | 0.65 |
| Life of Belt (hrs) | 1243 | 1435 | 1273 | 584 | 836 | 956. | 1052 |
| Damage | Teeth cracked, bottom land worn away | Teeth cracked, bottom land worn away | Teeth cracked, bottom land worn away | Belt cut, load carrying cords degraded | Teeth cracked, belt worn away significantly | Belt cut, load carrying cords degraded | Teeth cracked, belt worn away significantly |
| Elongation of Belt after Running Test (%) | 0.07 | 0.08 | 0.05 | 0.12 | 0.15 | 0.12 | 0.12 |

The toothed belts produced, as described above, were tested to ascertain belt life and elongation with the resulting data shown in Table 7.

Running Test

Figure 3:
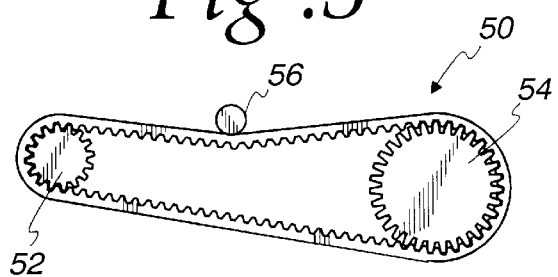
FIG. 3 is a schematic representative of a system for testing toothed belts.

A test system, as shown at 50 in FIG. 3, was used at an ambient temperature of 100° C. The rubber of the back layer and the teeth at the dedendum was checked for cracks. When it was determined that the belt being tested could not adequately functional as a toothed belt, the belt life was considered terminated. The running time for the belt life was measured. The resulting data is shown in Table 7.

In the test system 50, the belts were trained around a driving pulley 52, having 20 teeth and operated at 6,000 rpm, and a driven pulley 54 having 40 teeth. A back surface tensioner 56 had a diameter of 52 mm. The initial tension of the toothed belt, which had a width of 19 mm, was 40 kg. f, approximately 2.7 times ordinary tension.

As seen in Table 7, the inventive belts had relatively little cracking and tooth wear and had lives longer than 1200 hours. With Comparative Example 1 the large diameter load carrying cords were degraded during running, as a result of which the belt was cut.

With Comparative Example 2, in which the number of strings is relatively small, the load carrying cords elongated significantly with the belt running. The elongation was to such a degree that the belt did not engage effectively with pulleys, resulting in excessive belt wear.

With Comparative Example 3, in which the tooth covering cloth was a canvas cloth without aramid fibers, the cloth was worn away significantly as a result of which the load carrying cords were also worn away and degraded. In the running test, the belt of Comparative Example 3 was cut before reaching 1000 hours of running time.

With Comparative Example 4, which had a relatively low number of strings in the load carrying cord and in which the load carrying cords had a relatively small diameter, a significant elongation of both the load carrying cords and belts occurred during running. The elongation reached a level that the belt did not engage effectively with cooperating pulleys. As a result, the belt showed significant wear and teeth were cracked and broken.

The foregoing disclosure of specific embodiments is intended to be illustrative of the broad concepts comprehended by the invention.

What is claimed is:

1. A toothed belt comprising:

a body having a length, an inside surface, an outside surface, laterally spaced sides, and a plurality of teeth spaced in a lengthwise direction on the inside of the body, there being an elongate load carrying cord embedded, and extending lengthwise, in the body; and a cloth layer on the inside surface of the body, wherein the load carrying cord has a diameter that is greater than 1.1 mm and not greater than 1.5 mm and is prepared by a) bundling glass fiber filaments each having a diameter of from 5 to 10 μm into strands, b) gathering and primary twisting a plurality of strands in one twist direction to form strings, and c) gathering and final twisting the strings in a direction opposite to the one twist direction.

2. The toothed belt according to claim 1 wherein the glass fiber filaments comprise high-strength glass fiber filaments.

3. The toothed belt according to claim 2 wherein the inside surface includes lands between adjacent teeth and the cloth layer covers the lands and the teeth on the inside surface of the body.

4. The toothed belt according to claim 3 wherein the load carrying cord has a center, the cloth layer has an inside surface and an outside surface and distance between the center of the load carrying cord and the inside surface of the cloth layer at the lands is from 0.75 to 1.00 mm.

5. The toothed belt according to claim 1 wherein the glass fiber filaments comprise at least one of U-glass, T-glass, R-glass, and S-glass.

6. The toothed belt according to claim 2 wherein the strands are primary twisted from 6 to 16 twists/10 cm.

7. The toothed belt according to claim 2 wherein each string has from 400 to 800 fiber filaments.

8. The toothed belt according to claim 2 wherein the strings are final twisted from 5 to 10 twists/10 cm.

9. The toothed belt according to claim 2 wherein the load carrying cord has from 15 to 25 strings.

10. The toothed belt according to claim 6 wherein each string has from 400 to 800 fiber filaments, the strings are final twisted from 5 to 10 twists/10 cm, and the load carrying cord has from 15 to 25 strings.

11. The toothed belt according to claim 2 wherein the cloth layer comprises warp and weft yarns and the weft yarns comprise aramid fibers.

12. The toothed belt according to claim 10 wherein the cloth layer comprises warp and weft yarns and the weft yarns comprise aramid fibers.

13. The toothed belt according to claim 4 wherein the cloth layer comprises warp and weft yarns and the weft yarns comprise aramid fibers.

14. The toothed belt according to claim 2 wherein the body has a back layer within which the load carrying cord is embedded, and the back layer and the teeth comprise an elastomer comprising acrylonitrile-butadiene copolymer rubber that is hydrogenated to at least 80% by weight.

15. The toothed belt according to claim 10 wherein the body has a back layer within which the load carrying cord is embedded, and the back layer and the teeth comprise an elastomer comprising acrylonitrile-butadiene copolymer rubber that is hydrogenated to at least 80% by weight.

16. The toothed belt according to claim 2 wherein the body has a back layer within which the load carrying cord is embedded and the back layer and teeth comprise a cross-linked rubber composition.

17. The toothed belt according to claim 2 wherein the cloth layer comprises a woven fabric comprising aramid fibers that make up at least 50% of the woven fabric.

18. The toothed belt according to claim 11 wherein the aramid fibers comprise at least one of poly-paraphenylene-terephthalamide, poly-metaphenylene-isophthalamide, and poly-paraphenylene-3,4-diphenyl ether-terephthalamide.

19. The toothed belt according to claim 1 wherein the number of final twists per unit length for the strings is 0–10% less than the number of primary twists per unit length for the strands.

20. The toothed belt according to claim 14 wherein the elastomer further comprises at least one of carbon black, a plasticizer, and a cross-linking agent.

* * * * *